(12) United States Patent
Jaeckle et al.

(10) Patent No.: US 11,187,327 B2
(45) Date of Patent: Nov. 30, 2021

(54) BUTTERFLY VALVE

(71) Applicant: Georg Fischer Rohrleitungssysteme AG, Schaffhausen (CH)

(72) Inventors: Timo Jaeckle, Hilzingen (DE); Stefan Buergi, Basadingen (CH)

(73) Assignee: Georg Fischer Rohrleitungssysteme AG

( * ) Notice: Subject to any disclaimer, the term of this patent is extended or adjusted under 35 U.S.C. 154(b) by 0 days.

(21) Appl. No.: 16/843,126

(22) Filed: Apr. 8, 2020

(65) Prior Publication Data

US 2020/0325993 A1 Oct. 15, 2020

(30) Foreign Application Priority Data

Apr. 10, 2019 (EP) .................. 19 168 297

(51) Int. Cl.
*F16K 1/22* (2006.01)
*F16K 27/02* (2006.01)

(52) U.S. Cl.
CPC .......... *F16K 1/222* (2013.01); *F16K 27/0218* (2013.01)

(58) Field of Classification Search
CPC ..... F16K 1/222; F16K 27/0218; F16K 25/005
See application file for complete search history.

(56) References Cited

U.S. PATENT DOCUMENTS

| | | | | |
|---|---|---|---|---|
| 3,750,698 A | * | 8/1973 | Walchle | F16K 1/22 137/375 |
| 4,148,458 A | * | 4/1979 | Holtgraver | F16K 27/0218 137/375 |
| 4,676,268 A | * | 6/1987 | Sano | F16K 3/22 137/375 |
| 7,744,061 B2 | * | 6/2010 | Isogai | F16K 1/222 251/208 |
| 9,816,635 B2 | | 11/2017 | Jaeckle | |
| 9,945,491 B2 | | 4/2018 | Stumpp et al. | |
| 2019/0219191 A1 | | 7/2019 | Hunnekuhl et al. | |

FOREIGN PATENT DOCUMENTS

| | | |
|---|---|---|
| EP | 3 489 555 A1 | 5/2019 |
| JP | S62-062061 A | 3/1987 |
| JP | 3123908 B2 | 1/2001 |
| JP | 2016-070400 A | 5/2016 |
| JP | 6387493 B2 | 9/2018 |
| WO | WO-2018016538 A1 * | 1/2018 ............. F16K 1/222 |

* cited by examiner

*Primary Examiner* — Michael R Reid
(74) *Attorney, Agent, or Firm* — Harness, Dickey & Pierce, P.L.C.

(57) ABSTRACT

Butterfly valve for shutting off or regulating a medium, which flows through a pipeline, containing a housing, wherein the housing is configured in one piece and is preferably composed of plastic, a disc and a shaft, wherein the disc can be pivoted along the shaft between an open position and a closed position, wherein the disc comprises a core composed of plastic and a shell composed of plastic, wherein the plastic of the core and the plastic of the shell are different.

10 Claims, 4 Drawing Sheets

BUTTERFLY VALVE

CROSS-REFERENCE TO RELATED APPLICATIONS

The present application is based on, and claims priority from European Patent Application No. 19 168 297.0, filed Apr. 10, 2019, the disclosure of which is hereby incorporated by reference herein in its entirety.

FIELD OF THE INVENTION

The invention relates to a butterfly valve for shutting off or regulating a medium, which flows through a pipeline, containing a housing, wherein the housing is configured in one piece and is preferably composed of plastic, a disc and a shaft, wherein the disc can be pivoted along the shaft between an open position and a closed position.

BACKGROUND OF THE INVENTION

In pipeline construction, butterfly valves are used to close pipelines which transport liquid or gaseous media or to regulate the throughflow. To this end, it is necessary for the valves to withstand the pressure in the pipelines.

JP 6387493 B2 discloses a butterfly valve in which the valve comprises metal plates inside in order to attain a high strength, and the valve is coated with a corrosion-resistant layer in order to protect the valve against corrosion.

JP 3123908 also discloses a valve which comprises a metal core and is surrounded by a plastics layer.

In the aforementioned prior art, the outer layer for protecting against corrosion is applied to the metal valves.

It is disadvantageous here that the butterfly valve has a high weight and that, upon detachment of the plastics layer, corrosion can form and the butterfly valve no longer meets the requirements.

SUMMARY OF THE INVENTION

It is an aspect of the invention to propose a butterfly valve and a production method therefor, with the butterfly valve being able to withstand the internal pressures which arise in the pipelines and also having a medium-resistant and simple assembly.

Said aspect is achieved according to the invention in that the disc comprises a core composed of plastic and a shell composed of plastic, wherein the plastic of the core and the plastic of the shell are different, and in that, in the production method of the butterfly valve according to the invention, the shaft is plugged in the form of a plug-in shaft through the disc.

The butterfly valve according to the preferred embodiment of the invention comprises a housing, wherein the housing is configured in one piece. This affords the advantage that no additional assembly steps are required and it is also not necessary to install any additional sealing elements. The housing is preferably produced from plastic.

The butterfly valve comprises a disc which is used to open and close the butterfly valve and thereby regulates the throughflow of the medium in the pipeline. For the opening and closing operations, the disc can pivot about a shaft, wherein the shaft preferably extends horizontally or vertically. The butterfly valve is preferably of centric or eccentric construction, that is to say that the pivot point of the disc, when the butterfly valve is closed, can be in the centre of the disc along the pipeline axis or else offset from the centre along the pipeline axis. The disc comprises a core and a shell, wherein the core and the shell are each produced from a different plastic. In order to fulfil the requirements of high strength and resistance with respect to the medium, the core is composed of a tough, high-strength plastic and the plastic of the shell has good resistance to media. The disc is produced by means of a multicomponent injection-moulding method. It goes without saying that the disc can also be produced in an insertion method, that is to say that the core is injection-moulded separately and is subsequently overmoulded with the plastic of the shell in another mould. The plastic of the core has a higher strength than the plastic of the shell, with which the core is overmoulded. The core and the shell comprise different plastics. The core preferably comprises a plastic with a reinforcement and the shell preferably consists of a non-reinforced, semi-crystalline or amorphous plastic.

It is advantageous for the shell to completely surround the outer surface or the surface of the core which comes into contact with the medium; this affords the core good protection against the medium; The plastic of the shell fills the cutouts or cavities between the webs in the ribbed structure which the core preferably comprises. Owing to the ribbed structure of the core and by virtue of the fact that the plastic of the shell is arranged around the ribs and in the cutouts, as well as on the outer side of the core, the shell and core comprise a network structure, as a result of which it is ensured that the shell does not become detached from the core. The shell and core are preferably connected to one another in a positively locking manner. There is preferably no material bond between the shell and the core.

The disc comprises a through-bore. The bore is used to accommodate the plug-in shaft. As already mentioned above, the disc is preferably configured as a multicomponent injection-moulded part, especially preferably as a two-component injection-moulded part, which provides one plastic for the core and a different plastic for the shell in order to fulfil the corresponding requirements.

In order to make the core tough and high-strength, the core is preferably formed of a reinforced plastic, preferably reinforced with fibres or beads, especially preferably reinforced with glass or carbon fibres.

The shell is preferably formed of a medium-resistant plastic, preferably of a semi-crystalline or amorphous plastic without reinforcement.

According to a preferred configuration, the core comprises a ribbed structure, wherein the cutouts between the webs are continuously open from the one core upper side to the other core upper side. Said ribbed structure affords the advantage that the plastic of the shell is arranged in the cutouts and around the ribs. This brings about crosslinking of the two plastics and optimal fastening of the shell on the core, wherein the plastic is also arranged around the upper sides of the core and thus forms a closed shell around the core, preferably with internal crosslinking of the shell plastic and of the core, as a result of which the shell cannot become detached from the core. The core and the shell preferably comprise a form fit. It is advantageous for the two plastics not to form a material bond.

The shaft is preferably configured as a plug-in shaft, wherein the plug-in shaft is configured as a separate part and is plugged through the disc or the bore in the disc, wherein the plug-in shaft is mounted in the housing. Said construction with a plug-in shaft, which protrudes through the entire disc, affords the advantage of simple assembly as well as the ability to simply exchange the disc in the case of a defect. The plug-in shaft is preferably produced from a metallic material, preferably steel.

Connecting the plug-in shaft to the disc in a positively locking manner has been shown to be a preferred embodiment. This makes it possible to initiate the pivoting movement of the disc by way of the plug-in shaft, with which the disc then correspondingly co-rotates. For this purpose, the plug-in shaft preferably comprises at least one straight surface which corresponds to a straight surface in the bore of the disc. The co-rotation of the disc is therefore ensured by way of simple insertion of the plug-in shaft.

The method for producing a butterfly valve preferably comprises the following steps of:
- producing a one-piece housing, preferably in an injection-moulding method,
- producing a disc, wherein the disc is produced in a two-component injection-moulding method,
- fitting the disc in the housing, wherein a plug-in shaft is plugged through the housing and the disc, wherein the ends of the plug-in shaft are mounted in the housing and the plug-in shaft forms the pivot shaft of the disc.

BRIEF DESCRIPTION OF THE DRAWINGS

An exemplary embodiment of the invention will be described with reference to the figures, the invention not being limited to just the exemplary embodiment. In the figures.

DETAILED DESCRIPTION OF THE PREFERRED EMBODIMENT

Figure 1:
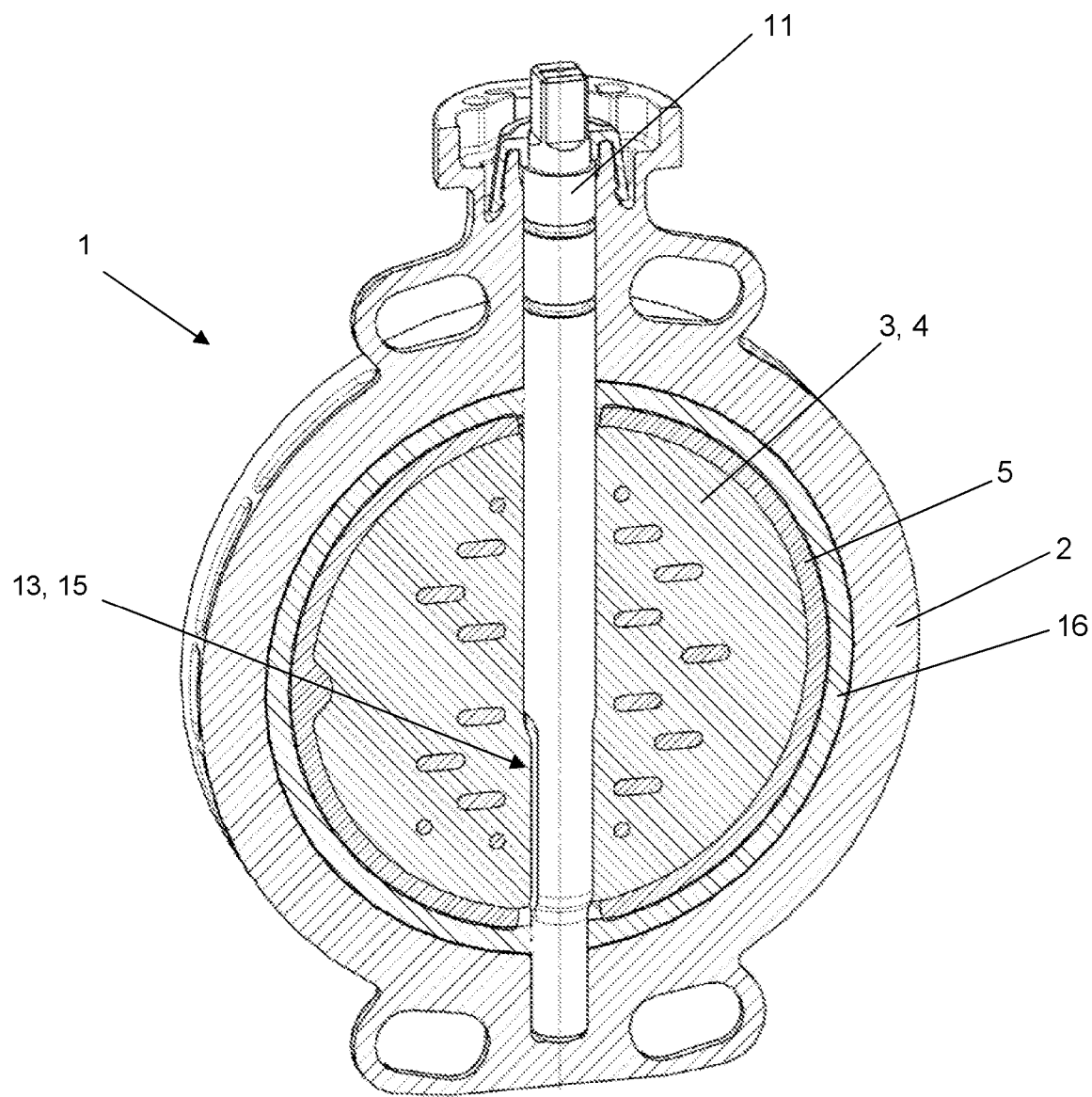
FIG. 1 shows a longitudinal section through a butterfly valve according to the invention.

The drawing illustrated in FIG. 1 shows a longitudinal section through a butterfly valve 1 according to the invention. The butterfly valve 1 is used to shut off and regulate a medium which flows through a pipeline. The butterfly valve 1 comprises a housing 2, wherein the housing 2 is configured in one piece. This has the advantage that additional seals are omitted, and also that a butterfly valve 1 can be assembled simply and economically. The housing 2 is preferably formed from plastic, with other materials, such as metal or composite materials, being also conceivable. In order to seal the butterfly valve 1 in an optimal manner, a seal 16 is arranged in the housing 2. In order to block or regulate the throughflow of the medium, the butterfly valve 1 comprises a disc 3. The disc 3 can be pivoted along the shaft 11. The embodiment depicted shows a centric butterfly valve 1, with eccentric embodiments in which the shaft does not extend through the centre of the disc in relation to the thickness of the disc, but rather extends offset with respect thereto, also being conceivable. The disc 3 comprises a core 4 and a shell 5, wherein the shell 5 and the core 4 are not composed of the same plastic. The core 4 comprises a plastic with a high strength or higher strength than the plastic of the shell 5. This is preferably achieved by way of the plastic of the core 4 comprising a reinforcement, for example beads or fibres or some other known reinforcing elements.

Figure 2:
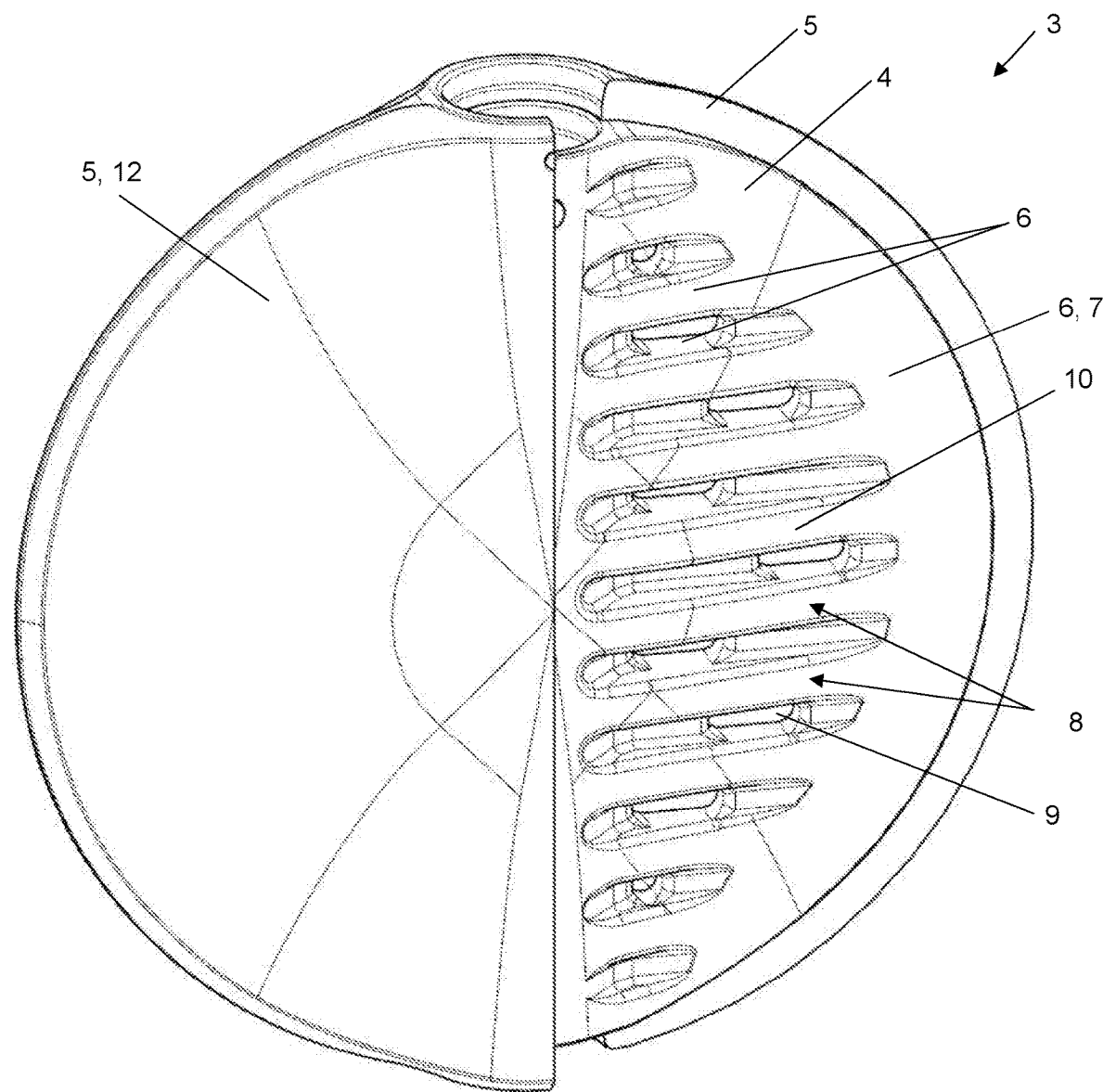
FIG. 2 shows a three-dimensional partial section of a disc.

FIG. 2 shows the disc 3 of the butterfly valve 1 according to the invention in a partial section. The ribbed structure 8 of the core 4 is readily apparent on the half with the shell 5 removed. The cutouts 9 run between the webs 10, said cutouts extending continuously from the one upper side 7 of the core 4 as far as the other upper side 7 of the core 4. This affords the advantage that the plastic of the shell 5 is arranged in, or fills, the cutouts 9 and thus connects the one outer layer 12 of the shell 5 to the other outer layer 12 of the shell 5 through the core 4. Said crosslinking of the disc 3, which is formed of at least two plastics and is configured as a multicomponent injection-moulded part, forms a form fit and prevents the detachment of the shell 5 from the core 4. It is also readily apparent that the shell 5 completely surrounds the outer surfaces 6 of the core 4, as a result of which the core 4 does not contact the medium, rather the medium contacts exclusively the shell 5 of the disc 3. The outer layer 12 of the shell 5 forms a flat surface in order, in the open state, to have no additional resistance and also no undercuts or edges on which bacteria or other contaminants could accumulate.

Figure 3:
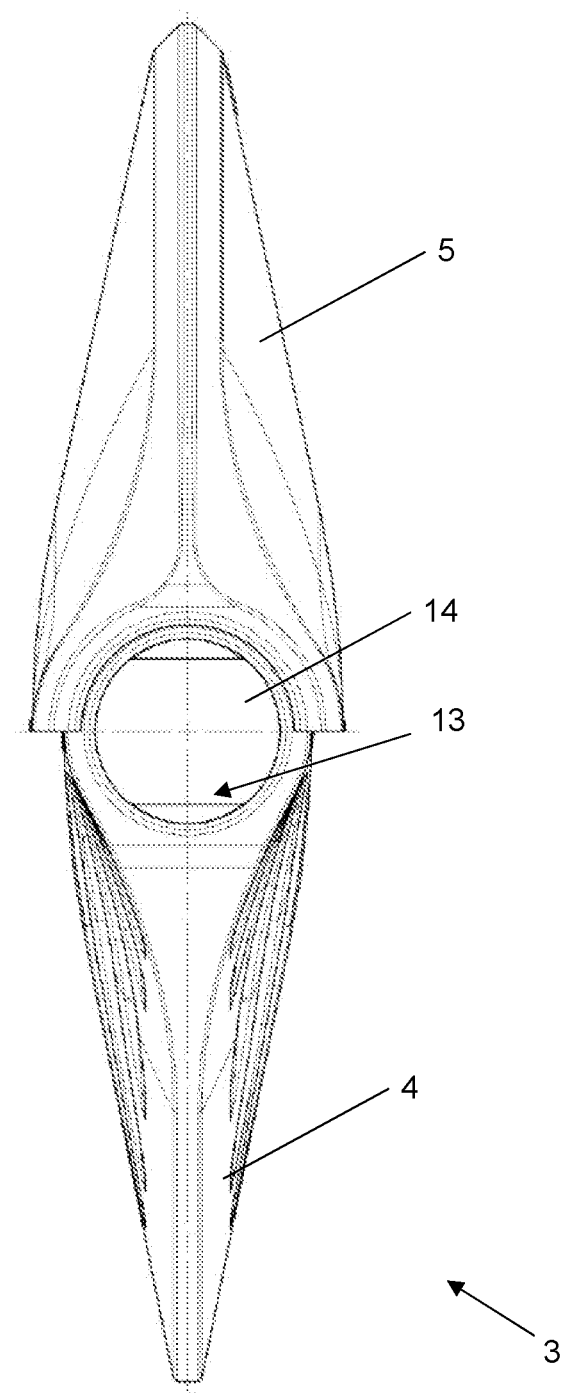
FIG. 3 shows a plan view of a disc.

FIG. 3 shows a plan view of a disc 3 of the butterfly valve 1 according to the invention, wherein, here too, the disc 3 is illustrated in partial section and the shell 5 has been removed on one half in order to show the core 4 of the disc 3. The disc 3 in the depicted embodiment has a lens shape, with other shapes of the disc also being conceivable and an eccentric arrangement of the shaft also being possible. The bore 14 is used to accommodate the shaft 11 or plug-in shaft, which is plugged through the disc 3, in order to arrange the disc 3 in the housing 2. The form fit 13 in the bore 14, which form fit enables the pivoting of the disc 3 by way of the shaft 11, is readily apparent. As is illustrated here, the form fit 13 can be effected by way of at least one straight surface, but can also be effected by way of a square or polygon or other positively locking connection possibilities which can preferably be implemented by way of simple insertion of a plug-in shaft.

Figure 4:
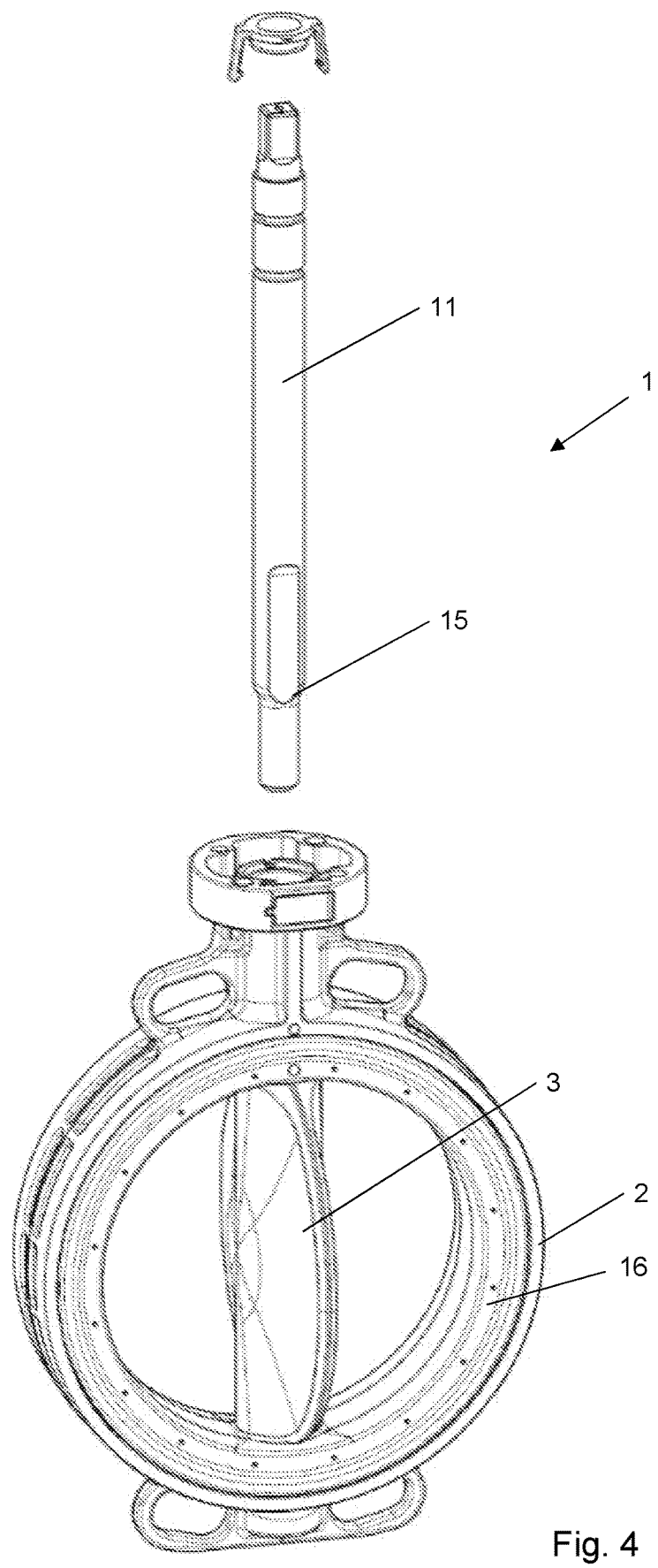
FIG. 4 shows an exploded view of a butterfly valve according to the invention.

FIG. 4 shows the butterfly valve 1 according to the invention in an exploded view. It is readily apparent here that the disc 3 is fastened in the housing 2 by way of the simple insertion of the shaft or plug-in shaft 11. The form fit 15 on the shaft 11 corresponds to the form fit 13 in the bore 14 of the disc 3. In FIG. 4, a surface is illustrated for realizing a form fit 13/15 between the disc 3 and the shaft 11; however, as already mentioned, this can also be realized by way of other form fits.

The butterfly valve 1 according to the invention is produced by producing a one-piece housing 2, preferably composed of plastic, in an injection-moulding method, and a disc 3, wherein the disc 3 is produced in a two-component injection-moulding method, and the butterfly valve 1 is assembled by way of the simple insertion of a plug-in shaft 11 through the disc 3, wherein the disc 3 is arranged in the housing 2 during the insertion and the plug-in shaft 11 is mounted in the housing.

The invention claimed is:

1. A butterfly valve for shutting off or regulating a medium, which flows through a pipeline, in a pipeline, containing a housing, comprising:
   a housing configured in one piece, a disc and a shaft,
   wherein the disc can be pivoted along the shaft between an open position and a closed position, the disc having a core composed of plastic and a shell composed of plastic,
   wherein the plastic of the core and the plastic of the shell are different;
   wherein the core is a plate with a ribbed structure having webs with cutouts between the webs, the cutouts extending radially outwardly from a central axis of the plate towards an edge of the plate, with the plastic of the shell extending through the cutouts from one side of the shell to an opposite side of the shell; and wherein the shaft is configured as a plug-in shaft, wherein the plug-in shaft is configured as a separate part and is plugged through the disc.

2. The butterfly valve according to claim 1, wherein the shell completely surrounds the outer surface of the core or the surface of the core which comes into contact with the medium, as a result of which the core does not contact the medium.

3. The butterfly valve according to claim 1, wherein the disc is configured as a multicomponent injection-moulded part.

4. The butterfly valve according to claim 1, wherein the core is formed of a reinforced plastic.

5. The butterfly valve according to claim 1, wherein the shell is formed of a medium-resistant plastic, selected from a semi-crystalline or amorphous plastic without reinforcement.

6. The butterfly valve according to claim 1, wherein the core comprises a ribbed structure having webs with cutouts between the webs, with the plastic of the shell extending through the cutouts from one side of the shell to an opposite side of the shell.

7. The butterfly valve according to claim 1, wherein the shaft is configured as a plug-in shaft, wherein the plug-in shaft is configured as a separate part and is plugged through the disc, and wherein the plug-in shaft is mounted in the housing.

8. The butterfly valve according to claim 7, wherein the plug-in shaft is connected to the disc in a positively locking manner.

9. A method for producing a butterfly valve, wherein the method comprises:

producing a one-piece housing, molding a disc having a plastic core and a plastic shell covering the core, wherein the plastic of the core is different from the plastic of the shell, fitting the disc in the housing, wherein a shaft is plugged through the housing and the disc, wherein ends of the shaft are mounted in the housing and the shaft forms the pivot shaft of the disc.

10. The method of claim 9 wherein the core has a plurality of webs spaced apart by continuous cutouts, with the plastic of the shell extending through the cutouts from one side of the shell to an opposite side of the shell.

* * * * *